(12) United States Patent
Adamczewski

(10) Patent No.: US 6,206,564 B1
(45) Date of Patent: Mar. 27, 2001

(54) COOKING UTENSIL INCLUDING A TEMPERATURE SENSOR INTEGRATED INTO THE BOTTOM OF THE UTENSIL

(75) Inventor: David Adamczewski, Massingy (FR)

(73) Assignee: SEB SA, Ecully (FR)

( * ) Notice: Subject to any disclaimer, the term of this patent is extended or adjusted under 35 U.S.C. 154(b) by 0 days.

(21) Appl. No.: 09/235,757

(22) Filed: Jan. 25, 1999

(30) Foreign Application Priority Data

Jan. 23, 1998 (FR) .................................................. 98 00734

(51) Int. Cl.[7] .............................. G01K 1/08; A23L 37/00
(52) U.S. Cl. .............................. 374/141; 99/342; 99/343; 99/344
(58) Field of Search ..................... 374/141, 157, 374/180, 179; 99/342, 343, 344

(56) References Cited

U.S. PATENT DOCUMENTS

| 2,750,916 | * | 6/1956 | Hanington | 374/141 |
|---|---|---|---|---|
| 3,736,861 | * | 6/1973 | Kroyer et al. | 73/343 B |
| 3,742,178 | | 6/1973 | Harnden, Jr. | 219/10.77 |
| 4,541,733 | | 9/1985 | Andre | 374/149 |
| 5,441,344 | | 8/1995 | Cook, III | 374/141 |

FOREIGN PATENT DOCUMENTS

| 2 014 411 | 11/1971 | (DE) . |
|---|---|---|
| 2 664 148 | 1/1992 | (FR) . |
| 63-311130 | 12/1988 | (JP) . |

* cited by examiner

Primary Examiner—G. Bradley Bennett
Assistant Examiner—Gail Verbitsky
(74) Attorney, Agent, or Firm—Young & Thompson

(57) ABSTRACT

A temperature sensor integrated into the bottom of a cooking utensil and the electrical conductors connecting the sensor to an electronic circuit extend between the wall that constitutes the bottom of the utensil and a perforated plate fixed to that wall by cold pressing.

5 Claims, 4 Drawing Sheets

COOKING UTENSIL INCLUDING A TEMPERATURE SENSOR INTEGRATED INTO THE BOTTOM OF THE UTENSIL

BACKGROUND OF THE INVENTION

1. Field of the Invention

The present invention concerns a cooking utensil such as a saucepan or skillet having a bottom and a side wall.

2. Description of the Prior Art

U.S. Pat. No. 5,441,344 describes a cooking utensil having a temperature sensor such as a thermocouple integrated into the bottom of the utensil.

The thermocouple delivers a temperature-dependent voltage.

This voltage is processed by an electronic circuit that converts it into temperature units displayed on the handle of the utensil.

Integrating the temperature sensor into the bottom of the utensil is a complicated operation which increases the manufacturing cost and gives rise to a moisture sealing problem, in particular with regard to washing up water, given that, the sensor and the electrical conductors connected to it must be protected from all risk of contact with moisture.

The aim of the present invention is to solve the above problem.

SUMMARY OF THE INVENTION

Accordingly the invention is directed to a cooking utensil having a bottom, a side wall and a temperature sensor integrated into the bottom connected to an electronic circuit to process a parameter measured by the sensor and to display the temperature, wherein the temperature sensor and electrical conductors connecting the sensor to the electronic circuit extend between the wall that constitutes the bottom of the utensil and a perforated plate fixed to that wall by cold pressing.

The bottom and side walls of the utensil are made from an aluminum disk and the perforated plate fixed by cold pressing is preferably made of stainless steel.

The method of fixing the perforated plate to the bottom of the utensil by cold pressing is described in French patents Nos. 2 693 894 and 2 711 051, for example.

During application of the above process the metal of the bottom of the utensil enters the perforations in the plate which assures excellent anchoring of the perforated plate relative to the metal of the bottom of the utensil.

In accordance with the invention the perforated plate fixed by cold pressing to the bottom of the utensil performs the following two functions simultaneously:

- it makes the bottom of the utensil more resistant to deformation caused by sudden variations in thermal expansion of said bottom; and
- it protects the temperature sensor and the electrical conductors connected to it from moisture, from mechanical impact and from direct contact with the burner of a gas hob.

The temperature sensor can be a thermocouple, a negative temperature coefficient (NTC) resistor, a positive temperature coefficient (PTC) resistor, a PT100, a thermistor, etc.

In the case of a thermocouple the electronic circuit associated with the sensor detects a variation in the voltage when the temperature varies.

In the other cases the electronic circuit detects a variation in the ohmic value of the resistance.

In a preferred version of the invention the sensor is on the outside surface of the bottom near the center thereof, the perforated plate having a part that covers the sensor and a central part of the outside surface of the bottom and an elongate part that covers the electrical conductors and extends radially over the outside surface of the bottom and at least partly onto the side wall of the utensil.

The sensor and the conductors are preferably also housed in a groove.

The groove is advantageously formed on the outside surface of the wall that constitutes the bottom of the utensil.

In a preferred version of the invention the electronic circuit and the temperature display means are housed in a unit fixed to the handle of the utensil.

The unit is preferably removably attached to the handle so that it can be removed before the utensil is placed in a washing up bowl or a dishwashing machine.

Other features and advantages of the invention will become more apparent in the following description.

DETAILED DESCRIPTION OF THE PREFERRED EMBODIMENTS

Figure 2:
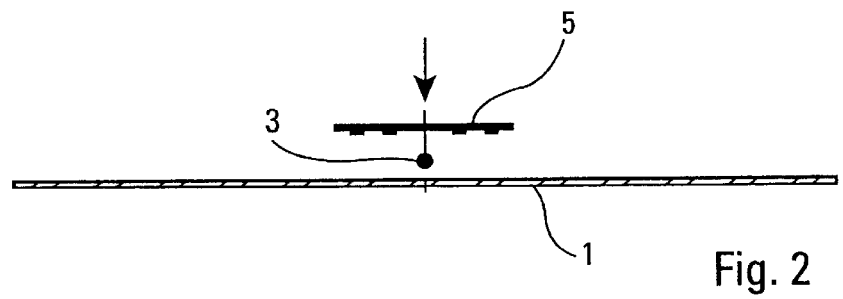
FIG. 2 is a view in section taken along the line II—II in FIG. 1 showing in schematic form the method of fixing the perforated plate and the heat sensor to a disk before the latter is pressed to form a container.
Figure 1:
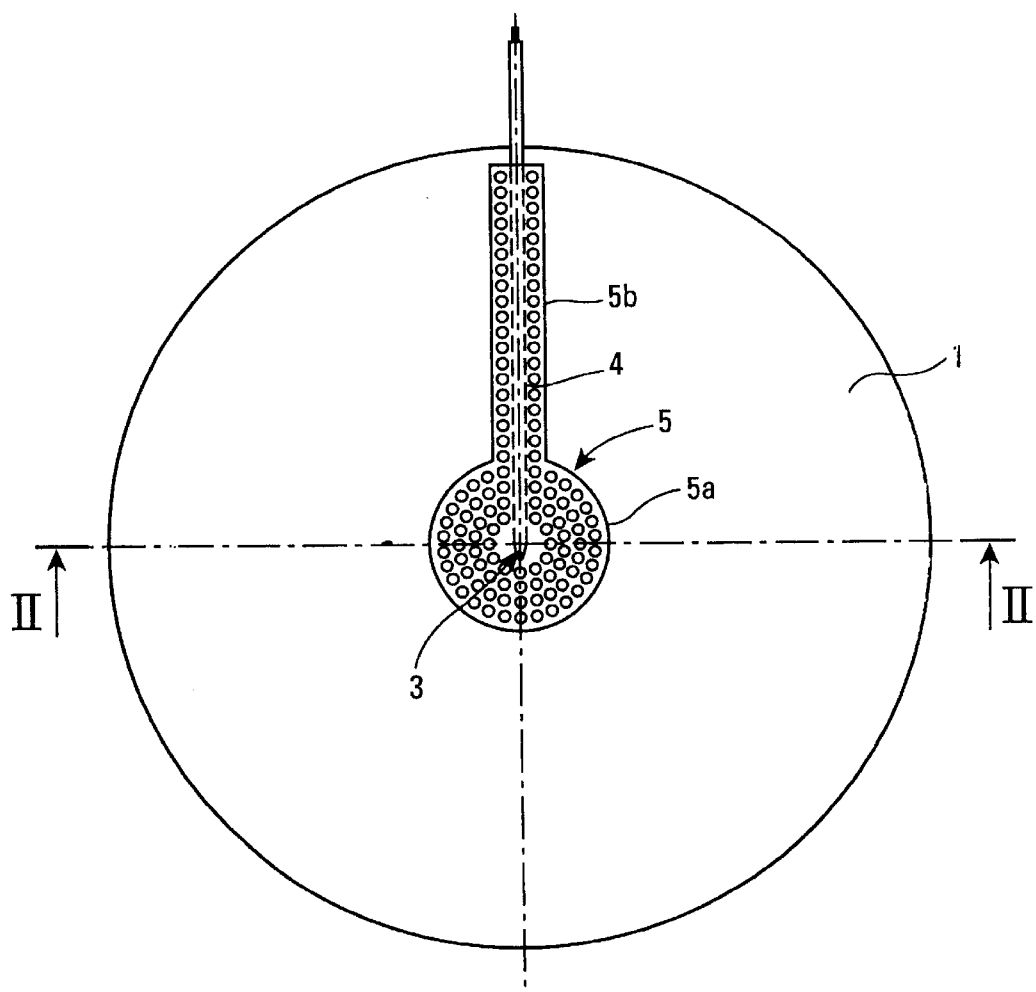
FIG. 1 is a plan view showing the metal disk before pressing onto which has been fixed a plate covering a temperature sensor and connecting conductors.
Figure 4:
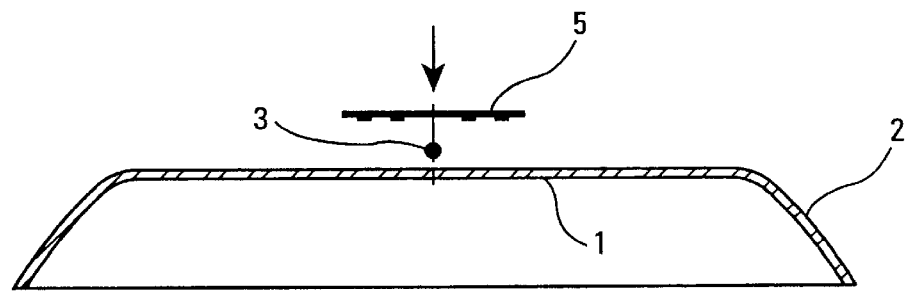
FIGS. 3 and 4 are views analogous to FIGS. 1 and 2 showing the fixing of the plate and the sensor to a previously pressed cooking container.
Figure 3:
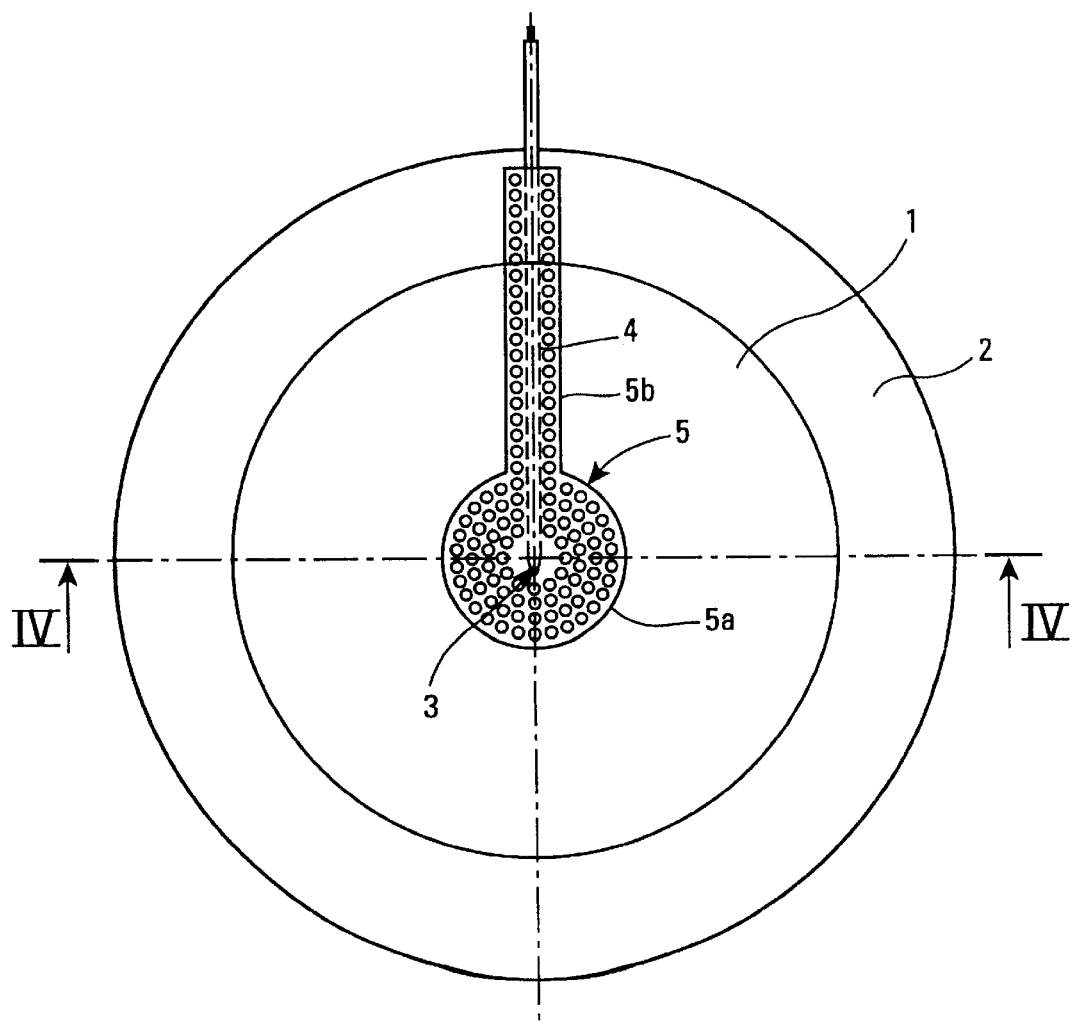

FIG. 3 shows a skillet having a bottom 1 and a side wall 2 made from a disk of, for example, aluminum.

A temperature sensor 3 is integrated into the bottom 1. The sensor 3 is connected to an electronic circuit to process the parameter measured by the sensor 3 and to display the temperature.

In accordance with the invention the temperature sensor 3 and the electrical conductors 4 connecting the sensor 3 to the electronic circuit extend between the wall 1 that constitutes the bottom of the utensil and a perforated plate 5, made of stainless steel, for example fixed to the aforementioned wall 1 by cold pressing.

In the example shown the sensor 3 is on the outside surface of the bottom 1 near its center.

The perforated plate 5 has a circular part 5a that covers the sensor 3 and a central part of the outside surface of the bottom 1 and an elongate part 5b which covers the electrical conductors 4 and extends radially across the outside surface of the bottom 1 and at least partly onto the side wall 2 of the skillet.

Figure 5:
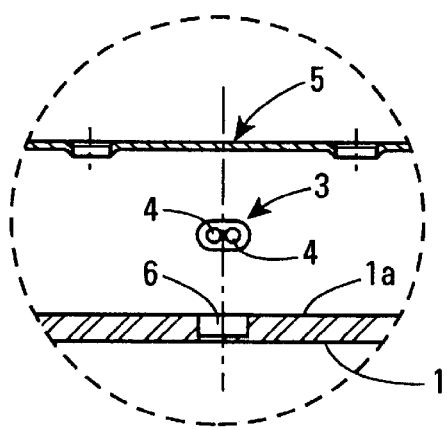
FIG. 5 is a sectional view to a larger scale of part of the perforated plate, the sensor and the bottom of the utensil before fixing by pressing.
Figure 6:
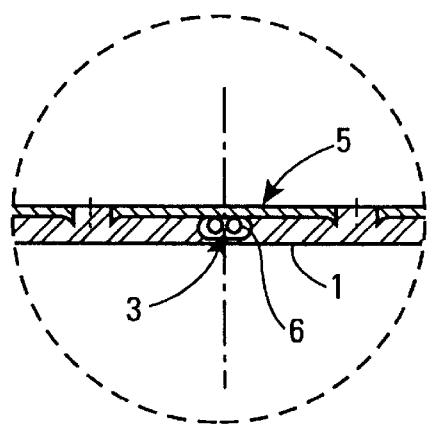
FIG. 6 is a view analogous to FIG. 5 showing the assembly after fixing by pressing.
Figure 7:
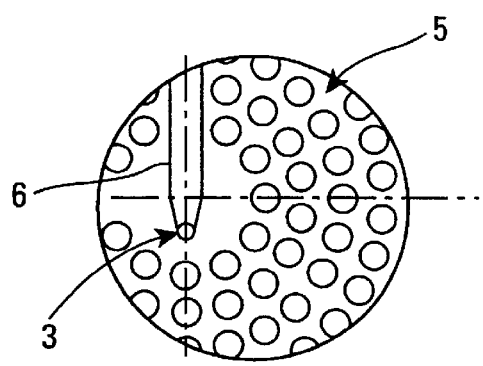
FIG. 7 is a plan view showing part of the perforated plate covering the heat sensor.

FIGS. 5 through 7 show that the sensor 3 and the conductors 4 are housed in a groove 6 formed on the outside surface 1a of the wall that constitutes the bottom 1 of the utensil.

Figure 8:
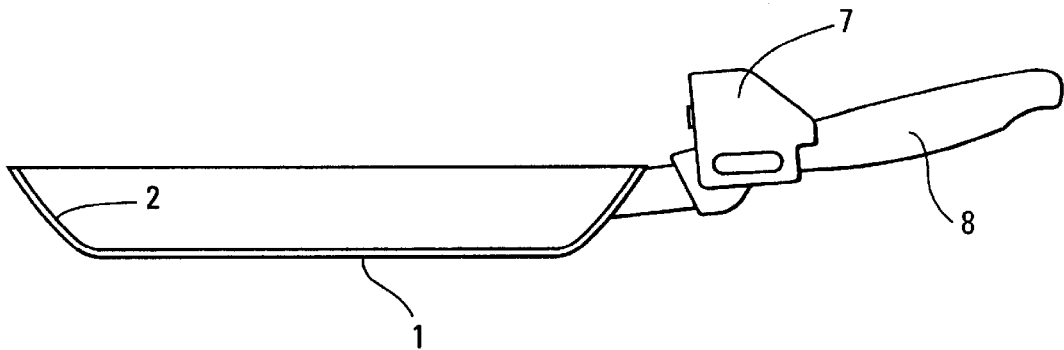
FIG. 8 is a sectional view of a skillet whose handle includes a housing comprising an electronic circuit and temperature display means.
Figure 9:
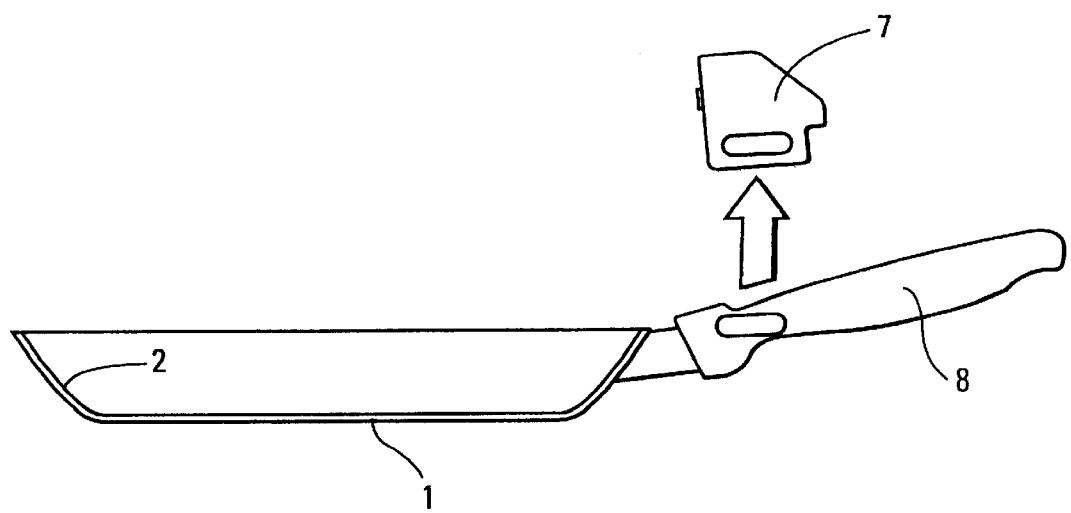
FIG. 9 is a view analogous to FIG. 8 showing that the electronic unit can be detached from the handle.

In the example shown in FIGS. 8 and 9 the electronic circuit and the temperature display means are housed in a unit 7 removably attached to the handle 8 of the skillet, so that the unit 7 can be removed before putting the skillet into a dishwashing machine.

For details of the method of fixing the perforated plate 5 to the bottom 1 of the utensil before or after the latter is pressed reference may be had to the description of French patents Nos 2 693 894 and 2 711 051.

After the cold pressing operation the perforated plate 5 is firmly attached to the surface of the bottom 1 as shown in FIG. 6 in particular and covers in a watertight manner the heat sensor 3 and the electrical conductors 4 that connect the sensor 3 to the electronic unit 7.

In this position the sensor 3 is totally integrated into the bottom of the cooking utensil and can measure the temperature thereof under optimum conditions.

Of course, the invention is not limited to the embodiment that has just been described and many modifications can be made thereto without departing from the scope of the invention.

Accordingly, the electronic temperature display unit could be fixed to a handle detachable from the utensil rather than being itself detachable from the handle of the utensil.

What is claimed is:

1. A cooking utensil comprising:
   a metal bottom;
   side wall; and
   a temperature sensor integrated into said bottom connected to an electronic circuit for processing a parameter measured by said sensor and displaying a temperature determined by said electronic circuit from said parameter,
   said temperature sensor and electrical conductors connecting said sensor to said electronic circuit extending between an outside undersurface of said bottom of said utensil and a perforated plate fixed to said outside of said bottom cold pressing during which the metal of said bottom enters the perforations of said perforated plate,
   said sensor being near the center of said bottom, and
   said perforated plate having
      a part that covers said sensor and a central part of said outside surface of said bottom, and
      an elongate part that covers said electrical conductors and extends radially over said outside surface of said bottom and at least partly onto said side wall of said utensil.

2. The utensil claimed in claim 1 wherein said sensor and said conductors are housed in a groove.

3. The utensil claimed in claim 2 wherein said groove is formed on the outside surface of said bottom that constitutes said bottom of said utensil.

4. The utensil claimed in claim 1 wherein said electronic circuit has a temperature display means housed in a unit fixed to a handle of said utensil.

5. The utensil claimed in claim 4 wherein said unit is removably fixed to said handle.

* * * * *